United States Patent
Ming et al.

(10) Patent No.: US 10,049,262 B2
(45) Date of Patent: Aug. 14, 2018

(54) METHOD AND SYSTEM FOR EXTRACTING CHARACTERISTIC OF THREE-DIMENSIONAL FACE IMAGE

(71) Applicant: Tencent Technology (Shenzhen) Company Limited, Shenzhen (CN)

(72) Inventors: Yue Ming, Shenzhen (CN); Jie Jiang, Shenzhen (CN); Tingting Liu, Shenzhen (CN); Juhong Wang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/206,338

(22) Filed: Jul. 11, 2016

(65) Prior Publication Data

US 2016/0371539 A1    Dec. 22, 2016

Related U.S. Application Data

(63) Continuation of application No. PCT/CN2015/075639, filed on Apr. 1, 2015.

(30) Foreign Application Priority Data

Apr. 3, 2014    (CN) .......................... 2014 1 0133560

(51) Int. Cl.
  *G06K 9/00*    (2006.01)
  *G06K 9/46*    (2006.01)
  (Continued)

(52) U.S. Cl.
  CPC ..... *G06K 9/00281* (2013.01); *G06K 9/00268* (2013.01); *G06K 9/00302* (2013.01);
  (Continued)

(58) Field of Classification Search
  CPC ............ G06K 9/00281; G06K 9/4671; G06K 9/4604; G06K 9/52
  See application file for complete search history.

(56) References Cited

U.S. PATENT DOCUMENTS

| 2005/0084140 A1* | 4/2005 | Kakadiaris | G06K 9/00288 382/118 |
| 2009/0185746 A1* | 7/2009 | Mian | G06K 9/00201 382/209 |

FOREIGN PATENT DOCUMENTS

| CN | 101930537 | 12/2010 |
| CN | 103246875 | 8/2013 |
| WO | WO 2015/149696 | 10/2015 |

OTHER PUBLICATIONS

Ming et al: "Robust sparse bounding sphere for 3D face recognition", IVC, 2012.*

(Continued)

*Primary Examiner* — Ruiping Li
(74) *Attorney, Agent, or Firm* — Morgan, Lewis & Bockius LLP

(57) ABSTRACT

A method for extracting a characteristic of a three-dimensional face image includes: performing face area division, to obtain a group of face areas; projecting each face area onto a corresponding regional bounding sphere; obtaining an indication of the corresponding face area according to the regional bounding sphere, and recording the indication as a regional bounding spherical descriptor of the face area; calculating a weight of the regional bounding spherical descriptor of the face area for each face area; and obtaining a characteristic of a three-dimensional face image according to the indication of the face area and the corresponding weight.

18 Claims, 8 Drawing Sheets

(51) Int. Cl.
*G06K 9/52* (2006.01)
*G06T 7/60* (2017.01)
*G06T 17/00* (2006.01)
*G06T 7/11* (2017.01)
*G06T 7/13* (2017.01)

(52) U.S. Cl.
CPC ......... *G06K 9/4604* (2013.01); *G06K 9/4671* (2013.01); *G06K 9/52* (2013.01); *G06T 7/11* (2017.01); *G06T 7/13* (2017.01); *G06T 7/60* (2013.01); *G06T 17/00* (2013.01); *G06K 2009/4666* (2013.01); *G06T 2200/04* (2013.01); *G06T 2207/20112* (2013.01); *G06T 2207/30201* (2013.01)

(56) References Cited

OTHER PUBLICATIONS

Translation of International Search Report and the Written Opinion Dated May 20, 2015 From the State Intellectual Property Office of the People's Republic of China Re. Application No. PCT/CN2015/075639. (6 Pages).

* cited by examiner

METHOD AND SYSTEM FOR EXTRACTING CHARACTERISTIC OF THREE-DIMENSIONAL FACE IMAGE

RELATED APPLICATIONS

This application is a continuation of PCT Patent Application No. PCT/CN2015/075639 having International filing date of Apr. 1, 2015, which claims the benefit of priority of Chinese Patent Application No. 201410133560.4 filed on Apr. 3, 2014.

The contents of the above applications are incorporated by reference as if fully set forth herein.

FIELD BACKGROUND OF THE INVENTION

The present disclosure relates to face image processing technologies, and in particular to a method and a system for extracting a characteristic of a three-dimensional face image.

Face recognition and emotion analysis are two important branches in a biological characteristic recognition system, and are widely applied to remote communications, medical rescue and intelligent monitoring. In conventional technologies, extraction of a characteristic of a three-dimensional face image generally merely satisfies face recognition or emotion analysis individually. For example, for three-dimensional face recognition, in the conventional technologies, a face is divided into a group of areas, by individually selecting and matching different areas, result fusion is performed to improve recognition performance; also, large posture conversion is overcome by using face symmetry, and an automatic landmark detector is provided to estimate a posture and detect a sheltering area. However, these methods pay more attention to face recognition rather than face expression description. For face expression description, in the conventional technologies, a face action coding system is used as a face expression indication and used for face expression analysis, but the method is concerned with face expression description, and cannot distinguish different individuals.

However, more and more practices require that face recognition or emotion analysis is not satisfied individually, but both individuals and expressions need to be distinguished, that is, both face recognition and emotion analysis need to be distinguished.

SUMMARY OF THE INVENTION

A method for extracting a characteristic of a three-dimensional face image includes:

performing face area division, to obtain a group of face areas;

projecting each face area onto a corresponding regional bounding sphere;

obtaining an indication of the corresponding face area according to the regional bounding sphere, and recording the indication as a regional bounding spherical descriptor of the face area;

calculating a weight of the regional bounding spherical descriptor of the face area for each face area; and obtaining a characteristic of a three-dimensional face image according to the indication of the face area and the corresponding weight.

A system for extracting a characteristic of a three-dimensional face image includes a processor and a software module executed by the processor, the software module including:

an area dividing module, configured to perform face area division, to obtain a group of face areas;

a projecting module, configured to project each face area onto a corresponding regional bounding sphere;

a face area indication module, configured to obtain an indication of the corresponding face area according to the regional bounding sphere, and record the indication as a regional bounding spherical descriptor of the face area;

a weight calculating module, configured to calculate a weight of the regional bounding spherical descriptor of the face area for each face area; and a characteristic extracting module, configured to obtain a characteristic of a three-dimensional face image according to the indication of the face area and the corresponding weight.

DESCRIPTION OF SPECIFIC EMBODIMENTS OF THE INVENTION

To make objectives, technical solutions and advantages of the present disclosure more understandable and comprehensible, the present disclosure is further described in detail below with reference to accompanying drawings and embodiments. It should be understood that, specific embodiments described herein are merely used for explaining the present disclosure, but not used for limiting the present disclosure.

Figure 1:
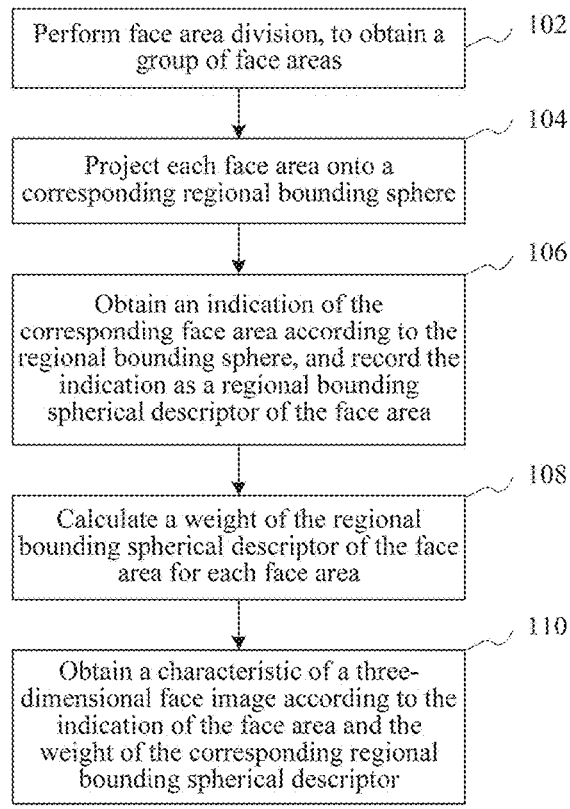
FIG. 1 is a schematic flowchart of a method for extracting a characteristic of a three-dimensional face image according to an embodiment.

As shown in FIG. 1, in an embodiment, a method for extracting a characteristic of a three-dimensional face image is provided, including:

Step 102: Perform face area division, to obtain a group of face areas.

In this embodiment, a pre-processed three-dimensional face image may be obtained, and the pre-processed three-dimensional face image is aligned with a reference face model. Then, area division may be performed on the input three-dimensional face image by using a shape band extracted from the reference face model.

Step 104: Project each face area onto a corresponding regional bounding sphere.

In this embodiment, for each face area in the three-dimensional face image, a regional bounding spherical descriptor is used as a projection of a relative location of point cloud data on the face area, which is imaged into a regional bounding sphere, and the sphere center of the regional bounding sphere is a centroid point of the corresponding face area.

That is, in step 104, each face area is projected, different face areas are imaged into different regional bounding spheres, and, sphere centers of regional bounding spheres obtained by imaging are centroid points of corresponding face areas; after a regional bounding sphere is determined, a face area may be indicated by using a value of a point on the regional bounding sphere. A regional bounding spherical descriptor (RBSR for short) is a description factor formed by a value of a point on a regional bounding sphere and used for indicating a corresponding face area, which is meant to describe a face area in this regional bounding sphere indication manner. In this embodiment of the present invention, a face area is indicated by using a regional bounding spherical descriptor.

Step 106: Obtain an indication of the corresponding face area according to the regional bounding sphere, and record the indication as a regional bounding spherical descriptor of the face area.

A face area may be indicated by using a vector formed by a value of a point on the face area, that is, a regional bounding spherical descriptor of a face area is a vector formed by a value of a point on the face area, and a regional bounding spherical descriptor of a face area may be obtained by defining a point on the face area. In this embodiment, a value of a point on a face area may be defined as a value of a point on a regional bounding sphere corresponding to the face area, and a value of a point on a regional bounding sphere is a ratio of a distance between a point on a face area and a centroid point of the face area to the radius of the corresponding regional bounding sphere.

Step 108: Calculate a weight of the regional bounding spherical descriptor of the face area for each face area.

None of surface characteristics of all face areas is the same, and therefore regional bounding spherical descriptors need to be weighted according to different face areas. Interaction information may effectively reflect a face distinguishing ability and a face expression description ability, the face distinguishing ability may be used for distinguishing different faces, that is, face recognition, and the face expression description ability may be used for distinguishing different expressions of a face, that is, emotion analysis. In this embodiment, interaction information between a regional bounding spherical descriptor of a face area and the face area, and interaction information between regional bounding spherical descriptors of different face areas may be obtained. The information can reflect a face distinguishing ability and expression description, and therefore, a weight of a regional bounding spherical descriptor of a face area can be obtained by means of calculation with reference to the interaction information, and by obtaining label information provided in advance to each face area.

Step 110: Obtain a characteristic of a three-dimensional face image according to the indication of the face area and the weight of the corresponding regional bounding spherical descriptor.

A characteristic of a three-dimensional face image is formed by indications of all face areas. A face area may be indicated by using a regional bounding spherical descriptor, and regional bounding spherical descriptors of different face areas have different weights, and therefore, in this embodiment, the extracted characteristic of the three-dimensional face image may be a total sum obtained after performing weighting on regional bounding spherical descriptors of all the face areas.

In this embodiment, each face area is projected onto a corresponding regional bounding sphere, an indication of the corresponding face area is obtained according to the regional bounding sphere, and recorded as a regional bounding spherical descriptor of the face area, the regional bounding spherical descriptor can effectively reflect surface area shape characteristics of different face areas, and characteristic extraction is performed with reference to a weight of a regional bounding spherical descriptor of each face area, so that a regional bounding spherical descriptor of a face area can be weighted based on a face distinguishing ability and a face expression description ability, and therefore both face recognition and emotion analysis can be satisfied.

In an embodiment, a group of face areas obtained by performing three-dimensional face area division includes seven areas: a nose area, a left eye area, a right eye area, a left cheek area, a right cheek area, a forehead area and a mouth area. How to obtain these seven areas by performing division is described in detail below.

Figure 2:
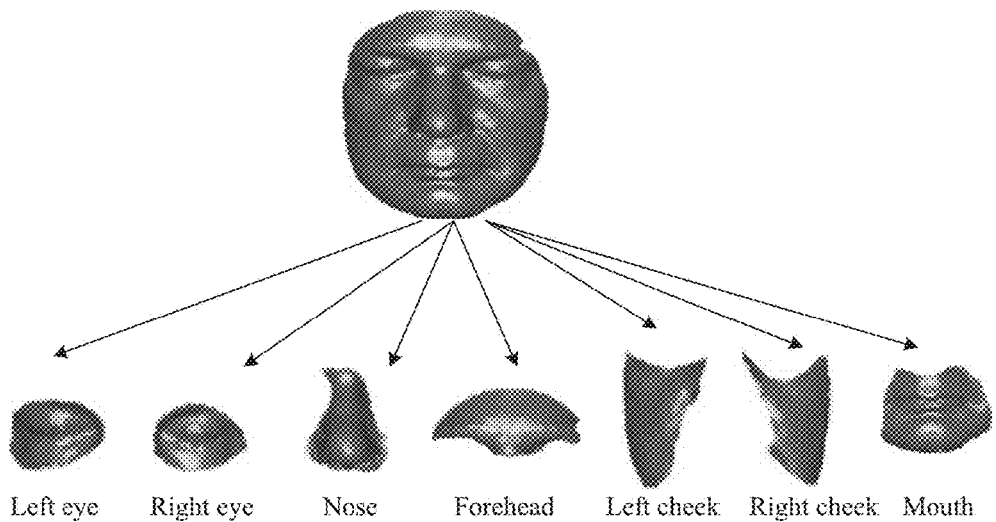
FIG. 2 is a schematic diagram of a face area division according to an embodiment.

With reference to FIG. 2, the obtained three-dimensional face image may be preferably a pre-processed three-dimensional face image, the pre-processing may remove some non-face areas from the original three-dimensional face image, and after locations of main organs on the three-dimensional face image are aligned, the three-dimensional face image is aligned with a reference face model. The pre-processed face image not only can improve face area division precision, but also can save calculation costs.

Specifically, the face area division process includes: obtaining a three-dimensional face image aligned with a reference face model; obtaining shape bands of different face areas extracted from the reference face model, and dividing the three-dimensional face image to obtain a nose area, a left eye area, a right eye area, and a mouth area; and dividing, according to the nose area, the left eye area, the eye area and the mouth area obtained by means of division, the three-dimensional face image to obtain a forehead area, a left cheek area and a right cheek area.

Further, the face area division process includes:
(1) Obtain a three-dimensional face image aligned with a reference face model.
(2) Detect a nasal tip point on the three-dimensional face image, obtain a shape band of a nose area extracted from the reference face model, and divide, according to the nasal tip point and the shape band of the extracted nose area, to obtain the nose area in the three-dimensional face image.

A three-dimensional face image without expression change in the front may be selected as the reference face model in this embodiment of the present invention. In this embodiment, a face center side hachure on a three-dimensional face image, that is, a facial symmetry axis, may be first detected and then a nasal tip point is searched for on the facial symmetry axis. Because geometrical shape index characteristics of main facial organ areas such as an eye socket, an outer eye corner and a nasal tip present a focusing ability, and the areas are conveniently separated from surrounding areas, facial key points may be positioned with reference to priori information and a shape index value of a face surface shape. In order to extract the facial symmetry axis, the shape index value based on a surface curvature may be used as a symmetrical descriptor, which has an invariability for rotation and translation. For each point on a three-dimensional face surface, if a maximum curvature value $k_1$ and a minimum curvature value $k_2$ are given, a shape index value of a surface point $P_i$ may be calculated as follows:

$$SI(p_i) = \frac{1}{2} - \frac{1}{\pi} tg^{-1} \frac{k_1(p_i) + k_2(p_i)}{k_1(p_i) - k_2(p_i)} \quad (1)$$

A left/right lateral nasal base point may be detected by using a shape index value, a saddle-shaped geometrical area at a nose boundary is characterized in that the shape index value approximates to 0.375, and therefore a nose boundary line similar to a saddle shape may be extracted according to the shape index value of the surface point. After the nasal tip point is found, the boundary outline of the nose on the three-dimensional face image may be determined according to the shape band of the nose area extracted from the reference face model, thereby obtaining the nose area in the three-dimensional face image by means of division. The shape band is specific bandwidth data of a model target object (that is, the reference face model) in the outline. The nose boundary line is extracted by using the shape index value, a low nose boundary outline is easily extracted, and the leftmost and rightmost nose boundary points along the nose boundary line are separately used as the leftmost and rightmost pixels.

(3) Separately detect inner eye corner locations of a left eye and a right eye on the three-dimensional face image, obtain a shape band of an eye area extracted from the reference face model, and divide, according to the inner eye corner locations and the shape band of the extracted eye area, to obtain the left eye area and the right eye area in the three-dimensional face image.

A point at the left/right inner eye corner location is located at an area above the nose, and has a shape structure similar to a cone, which is characterized in that the gaussian curvature value of the location approximates to zero, and therefore search may be performed on the face area by using a 3*3 search window, for example, search may be performed on an area above the nasal tip. When the area above the nasal tip and the area with the gaussian curvature value approximating to zero are found, the location is the inner eye corner location. After two inner eye corner locations are obtained, the left eye area and the right eye area may be determined with reference to the shape band of the eye area extracted from the reference face model.

(4) Obtain a shape band of a mouth area extracted from the reference face model, and divide, according to the shape band of the extracted mouth area, to obtain the mouth area in the three-dimensional face image.

As described above, the curvature value of the mouth area also has a characteristic. Because the nasal tip point is detected, search is performed below the nasal tip point, and the mouth area may be roughly obtained by means of division with reference to the shape band of the mouth area extracted from the reference face model.

(5) Divide, according to the left eye area and the right eye area, to obtain the forehead area in the three-dimensional face image.

An area above the left eye area and the right eye area is the forehead area.

(6) Divide, according to the left eye area, the right eye area and the mouth area, to obtain the left cheek area and the right cheek area in the three-dimensional face image.

The left eye area, the right eye area and the mouth area are already determined, the left cheek area is located between the left eye area and the mouth area, and the right cheek area is located between the right eye area and the mouth area, and therefore the left cheek area and the right cheek area may be roughly obtained by means of division.

A schematic diagram of seven areas obtained by means of division may be as shown in FIG. 2.

Figure 3A:
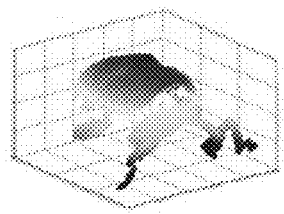
FIGS. 3(a), 3(b), 3(c), 3(d), 3(e) and 3(f) are schematic diagrams of pre-processing original three-dimensional face point cloud data according to an embodiment.

Further, in an embodiment, before the step of performing three-dimensional face area division, the method may further include a process of pre-processing the original three-dimensional face image, and with reference to FIG. 3, the pre-processing process specifically includes:

(1) Obtain original three-dimensional face point cloud data, as shown in FIG. 3(a).

(2) Extract main face data in the original three-dimensional face point cloud data.

Figure 3B:
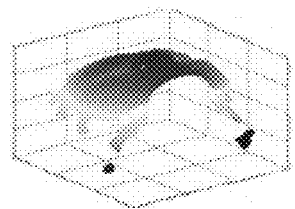

The so-called point cloud refers to a point data set, and the three-dimensional face point cloud data refers to a point data set indicating a three-dimensional face by using three-dimensional coordinates. Because the original three-dimensional face point cloud data generally includes some non-face areas, such as a neck, and a shoulder (as shown in FIG. 3(a)), face recognition precision may be improved by removing these non-face areas, and only extracting main face data. Main face data may be roughly extracted by using a conventional technology combining a 3D texture image and a corresponding effective point matrix (as shown in FIG. 3(b)).

Figure 3C:
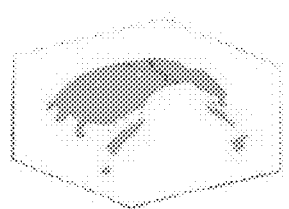
Figure 3F:
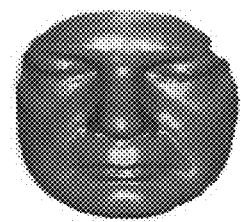
Figure 3E:
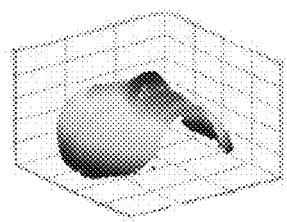
Figure 3D:
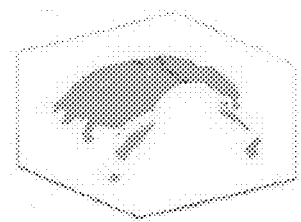

Further, as shown in FIG. 3(c), a symmetrical curve of the reference face model is extracted, and the nasal tip point may be detected according to the direction of the reference face model, and by rotating and translating the main face data (as shown in FIG. 3(d)). The detected nasal tip point may be used for subsequent face area division.

(3) Perform normalization processing on the main face data.

The performing normalization processing on the main face data refers to aligning locations of main organs on the face, so as to improve the accuracy rate of subsequent face recognition.

Specifically, in an embodiment, the normalization processing process includes: obtaining the reference face model, and calculating a horizontal-direction reference length value and a perpendicular-direction reference length value of the reference face model; calculating a horizontal-direction length value and a perpendicular-direction length value of the main face data; calculating a ratio of the horizontal-direction length value of the main face data to that of the reference face model and a ratio of the perpendicular-direction length value of the main face data to that of the reference face model; and implementing normalization on the main face data in a horizontal direction according to the ratio of the horizontal-direction length values and a coordinate value of the main face data in each horizontal direction, and implementing normalization on the main face data in a perpendicular direction according to the ratio of the perpendicular-direction length values and a coordinate value of the main face data in each perpendicular direction.

Specifically, in the horizontal direction, the ratio of the horizontal-direction length values may be divided by each coordinate value x or y in the horizontal direction of the main face data; in the perpendicular direction, the ratio of the perpendicular-direction length values may be divided by each coordinate value x or y in the perpendicular direction of the main face data. For example, the ratio of the horizontal-direction length values and the ratio of the perpendicular-direction length values may be calculated by using the following formula:

$$\text{ratioX} = \text{distX}/\text{distXone}, \text{ratioY} = \text{distY}/\text{distYone} \quad (2)$$

where, distX, and distY are respectively a horizontal-direction length value and a perpendicular-direction length value of the main face data, and distXone, and distYone are respectively a horizontal-direction reference length value and a perpendicular-direction reference length value of the reference face model. The ratioX is divided by each coordinate value x or y in the horizontal direction of the main face data, and the ratioY is divided by each coordinate value x or y in the perpendicular direction of the main face data, so as to complete the normalization processing on the main face data in the horizontal and perpendicular directions (as shown in FIG. 3(e)). The normalization processing is performed on the main face data, so that the subsequent area division process is more precise, and some areas sheltered by hair may be effectively removed, thereby improving the accuracy rate of face recognition.

(4) Align a three-dimensional face image obtained after the normalization processing with the reference face model, to obtain the three-dimensional face image aligned with the reference face model.

Posture variances very possibly occur in the input three-dimensional face image to an extent, and therefore, the three-dimensional face image needs to be aligned with the reference face model, thereby implementing precise matching on postures, so as to improve accuracy rates of subsequent area division and face recognition.

Rotation of the three-dimensional face image may be parameterized by using two values, and these two values are separately a rotation axis and a rotation angle; by separately fitting point cloud data on a symmetrical side hachure on the reference face model and point cloud data on a symmetrical side hachure on the three-dimensional face image, normal vectors on symmetrical side hachure fitting planes of the reference face model and the three-dimensional face model may be separately obtained, the rotation axis and the rotation angle are obtained according to these two normal vectors, and then these two values are substituted in a rotation formula and calculated, to obtain a matched three-dimensional face image aligned with the reference face model.

In an embodiment, the step of aligning a three-dimensional face image obtained after the normalization processing with the reference face model includes:

separately fitting point cloud data on a symmetrical side hachure for the reference face model and the three-dimensional face image obtained after the normalization processing, to obtain a first normal vector on a symmetrical side hachure fitting plane of the reference face model and a second normal vector on a symmetrical side hachure fitting plane of the three-dimensional face image; obtaining a rotation angle value which is an included angle between the first normal vector and the second normal vector, and obtaining a rotation axis which is a cross product of the first normal vector and the second normal vector; and obtaining, according to each point on the three-dimensional face image obtained after the normalization processing, the rotation angle value and the cross product, the three-dimensional face image aligned with the reference face model.

For example, if it is obtained by means of calculation that the first normal vector is $n_r$, and the second normal vector is $n_i$, the included angle between the normal vectors $n_r$ and $n_i$ is calculated as the rotation angle value $\theta$, and the cross product of these two normal vectors is the rotation axis $\omega$. Further, the rotation formula are preset as follows:

$$v_{roti} = v_i \cos\theta + (\omega \times v_i)\sin\theta + \omega(\omega \cdot v_i)(1-\cos\theta) \quad (3)$$

where, $V_i$ indicates each point on a three-dimensional face image obtained after the normalization processing, and $V_{roti}$ is a point obtained by means of calculation according to the rotation formula, that is, a point on the three-dimensional face image aligned with the reference face model.

Description about the rotation axis and the rotation angle adapts to processing of a rigid object, and therefore, matching of the input three-dimensional face image and the reference face model on rotation and translation scales is completed by using a three-dimensional face alignment method based on a rotation axis and a rotation angle, which has a very well alignment effect (as shown in FIG. 3(f)).

Figure 4:
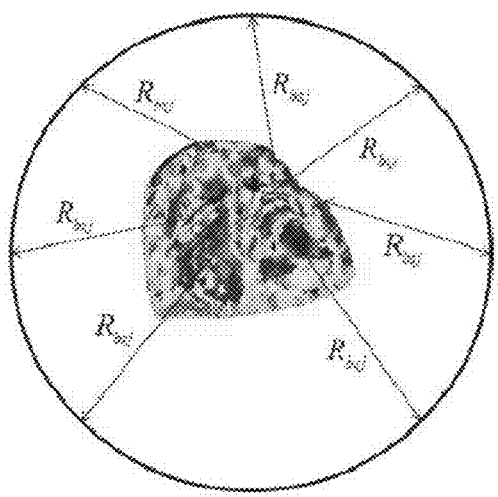
FIG. 4 is a schematic diagram of a regional bounding sphere indication of a face surface according to an embodiment.

With reference to FIG. 4, after area division is performed on the three-dimensional face image, seven face areas, which are separately a nose, a left eye, a right eye, a left cheek, a right cheek, a forehead and a mouth area are obtained. These face areas are projected onto corresponding regional bounding spheres, as shown in FIG. 4; each face area is projected, to obtain a regional bounding sphere of each face area, and each regional bounding sphere has a different radius $R_{bsj}$.

In an embodiment, the step of obtaining an indication of the corresponding face area according to the regional bounding sphere includes: calculating a value of a point on the face area for each face area, where the value of the point on the face area is a ratio of a distance between the point and the sphere center of the regional bounding sphere corresponding to the face area to the radius of the regional bounding sphere; and the indication of the face area is a vector formed by values of points on the face area.

In this embodiment, an indication of a face area is recorded as a regional bounding spherical descriptor of the face area, that is, a face area is indicated by using a regional bounding spherical descriptor. The sphere center of the regional bounding sphere is the centroid point of the face area.

Specifically, a value of a point on the face area is defined as follows:

$$\text{RBSR}(c_j) = \sqrt{(p_{ix}-c_{xj})^2 + (p_{iy}-c_{yj})^2 + (p_{iz}-c_{zj})^2}/R_{bsj} \quad (4)$$

where, $c_j$ is the centroid point of the jth face area, $p_i$ is a coordinate value of the ith point on the face area, $p_{ix}$, $p_{iy}$ and $p_{iz}$ are separately coordinate values of a point on the face area on the axis x, the axis y and the axis z, $c_{xj}$, $c_{yj}$ and $c_{zj}$ are separately coordinate values of the centroid point (that is, the sphere center of the corresponding regional bounding sphere) of the face area on the axis x, the axis y and the axis z, and $R_{bsj}$ is the radius of the regional bounding sphere corresponding to the jth face area.

The bounding spherical descriptor of the face area is:

$$RBSR^j = \{RBSR^j_1, \ldots, RBSR^j_N\}, 1 \le i \le N$$

where, $RBSR_j$ is a bounding spherical descriptor of the jth face area, and N is the number of points on the face area.

It can be known from the above description that, each face area is an N-dimensional vector, where N is the number of points on the face area. A point in the original three-dimensional face point cloud data is indicated by using a coordinate value in a three-dimensional space, so that an indication of each face area has a 3*N vector dimension. The face area is indicated by using a regional bounding spherical descriptor, and actually the original point cloud data of a 3*N dimension is converted into an N-dimensional vector, thereby saving calculation costs and storage space.

Further, because surface characteristics of different face areas are different, in order to reflect a face distinguishing ability and a face description ability, a regional bounding spherical descriptor of each face area needs to be weighted.

In an embodiment, the step of calculating a weight of the regional bounding spherical descriptor of the face area for each face area includes: calculating relevance and redundancy among all regional bounding spherical descriptors; obtaining label information provided for a face area and label information provided for the three-dimensional face image; and calculating the weight of the regional bounding spherical descriptor of each face area according to the relevance, the redundancy and the label information.

Further, in an embodiment, relevance of a regional bounding spherical descriptor may be defined as an average value of all interaction information between each regional bounding spherical descriptor and a corresponding face area. The calculation formula is as follows:

$$D(RBSR, r_i) = \frac{1}{|RBSR|} \sum_{rbsr_i \in RBSR} I(rbsr_i; r_i) \quad (5)$$

where, $r_i$ indicates the ith face area r, $rbsr_i$ indicates a bounding spherical descriptor of the ith face area, RBSR refers to regional bounding spherical descriptors of all face areas, and $I(rbsr_i; r_i)$ is interaction information between the area sphere descriptor of the ith face area and the face area.

Redundancy of a regional bounding spherical descriptor may be defined as a summation of average values of all interaction information between a regional bounding spherical descriptor of each face area and regional bounding spherical descriptors of other face areas. The calculation formula is as follows:

$$R(RBSR) = \frac{1}{|RBSR|^2} \sum_{rbsr_i, rbsr_j \in RBSR} I(rbsr_i; rbsr_j) \quad (6)$$

where, $rbsr_i$ is a regional bounding spherical descriptor of the ith face area, $rbsr_j$ is a regional bounding spherical descriptor of the jth face area, and $I(rbsr_i; r_i)$ is interaction information between the regional bounding spherical descriptor of the ith face area and the regional bounding spherical descriptor of the jth face area.

Further, label information provided by each face area is obtained, and the standard information is category information of each face, is a discretization coding indication of each face area, and is provided in advance for each face area in order to establish a connection between an individual and a corresponding face area. In this embodiment, the weight of the regional bounding spherical descriptor of each face area may be calculated by using the following formula:

$$P(RBSR | r_i) = \prod_{rbsr_i \in RBSR} P(l_i | r_i) \prod_{rbsr_j \in RBSR} P(l_j | l_i, r_i) P(D, R | r_i, l_i, l_j) \quad (7)$$

where, $l_i, l_j \in L$ is the label information provided for each face area; D is the relevance obtained by means of calculation; R is the redundancy obtained by means of calculation; $r_i$ indicates the ith face area; $rbsr_i$ indicates a regional bounding spherical descriptor of the ith face area; $rbsr_j$ indicates a regional bounding spherical descriptor of the jth face area; RBSR indicates regional bounding spherical descriptors of all face areas; $P(RBSR|r_i)$ indicates a weight of the regional bounding spherical descriptor of the ith face area.

In another embodiment, the weight of the regional bounding spherical descriptor of each face area may be calculated by using the following formula:

$$\omega_{r_i} = \sum_{l \in L} \log(P(b_l | r_i)) \quad (8)$$

where, $\omega_{r_i}$ indicates a weight of the regional bounding spherical descriptor of the ith face area; $\log(P(b_l|r_i))$ is a binary probability, and $$\log(P(b_l | r_i)) = \sum_{rbsr_i \in RBSR} \sum_{rbsr_j \in RBSR} \log(P(D, R | r_i, l_i, l_j)),$$

where: $rbsr_i$ indicates a regional bounding spherical descriptor of the ith face area; $rbsr_j$ indicates a regional bounding spherical descriptor of the jth face area; D is the relevance obtained by means of calculation; R is the redundancy obtained by means of calculation; $l_i, l_j \in L$ is the label information provided for each face area; $r_i$ indicates the ith face area; $b^l$ is label information provided for the three-dimensional face image.

Actually, a weight is indicated as a binary probability in the formula (8), which can reduce calculation complexity. The formula (8) may be obtained by rewriting the formula (7), and for convenience of understanding, the rewriting process is elaborated below:

For the formula (7), a log probability value is a minimal value avoiding numerical precision, and therefore the formula (7) may be indicated as follows:

$$\log P(RBSR | r_i) = \sum_{rbsr_i \in RBSR} \log P(l_i | r_i) + \sum_{rbsr_j \in RBSR} \log P(l_j | l_i, r_i) + \log P(D, R | r_i, l_i, l_j) \quad (9)$$

In order to reduce calculation complexity, it is assumed that $P(l_i|r_i)$ and $P(l_j, |l_i, r_i)$ are a same probability, and a non-uniform label probability may be calculated by associating an individual label histogram and every two area descriptor vectors in the probability formula, the formula (9) is rewritten as follows:

$$\log P(RBSR | r_i) = \sum_{rbsr_i \in RBSR} \sum_{rbsr_j \in RBSR} P(D, R | r_i, l_i, l_j) + C \quad (10)$$

A uniform probability of a label approximately estimated by using a constant C does not depend on the face area $r_i$, and therefore description may be omitted, and the formula (10) may be rewritten as a binary probability of a label based on the entire face as follows:

$$\omega r_i = \log(P(RBSR | r_i)) = \sum_{l \in L} \log(P(b_l | r_i)) \quad (11)$$

After a weight of a regional bounding spherical descriptor of each face area is obtained, a characteristic of the three-dimensional face image may be extracted with reference to the regional bounding spherical descriptor, and the extracted characteristic of the three-dimensional face image is an indication of the entire three-dimensional face image.

Specifically, the step of obtaining a characteristic of a three-dimensional face image according to the indication of the face area and the weight of the corresponding regional bounding spherical descriptor includes: obtaining the characteristic of the three-dimensional face image which is a sum of products of indications of all face areas and weights of regional bounding spherical descriptors of the corresponding face areas.

Preferably, a characteristic of the three-dimensional face image may be extracted by using the binary probability obtained by means of calculation in the formula (8) as a weight. The three-dimensional face image may be indicated as:

$$x_k = \omega_1(rbsr_1) + \ldots + \omega_i(rbsr_i) + \ldots + \omega_7(rbsr_7) \quad (12)$$

where, k indicates specific three-dimensional face processing, i is corresponding to different face areas, including seven areas: a nose area, a left eye area, a right eye area, a left cheek area, a right cheek area, a forehead area and a mouth area, ranging from 1 to 7.

In this embodiment, the indicating a face area by using a regional bounding spherical descriptor of the face area can effectively save calculation costs and storage space, and, with reference to relevance and redundancy which can reflect a face distinguishing ability and an expression description ability, weights of regional bounding spherical descriptors of different face areas are obtained by means of calculation; when the three-dimensional face image is indicated, an indication of (characteristic) of the entire three-dimensional face image is obtained with reference to regional bounding spherical descriptors of different face areas and corresponding weights, and because a weighted regional bounding spherical descriptor can very well reflect the face distinguishing ability and the expression description ability, the extracted characteristic of the three-dimensional face image can satisfy both face recognition and emotion analysis.

Further, in an embodiment, the step of obtaining a characteristic of a three-dimensional face image according to the indication of the face area and the weight of the corresponding regional bounding spherical descriptor further includes: embedding the characteristic of the three-dimensional face image into an inherent lower-dimensional characteristic vector according to the following formula:

$$Z = AX \quad (13)$$

where X is the characteristic of the three-dimensional face image; and A is a regression matrix formed by the inherent lower-dimensional characteristic vector.

In this embodiment, how to extract a characteristic of a three-dimensional face image by using a regional and global regression mapping algorithm (RGRM algorithm for short) is elaborated, so as to overcome some artifacts left from area division, such as some stretched or misplaced images, hair sheltering, big data noise and damage.

In this embodiment, it is assumed that $X \subset R^D$ is a descriptor of the entire three-dimensional face image obtained by means of calculation in the foregoing embodiment, that is, a characteristic of the three-dimensional face image. Two regression functions $a_1$ and $a_2$ need to be learnt, so as to obtain corresponding lower-dimensional characteristic vectors $z_1$ and $z_2$. Because structures of multiple areas in three-dimensional face data are linear, the regression expression is defined as a linear regression model, that is, $Y = W^T X + E$, where, W is a local projection matrix, and E is a noise matrix. Then, the weighted descriptor of the three-dimensional face image is mapped to Hilbert spaces H and R, to obtain: $y_i = \phi(W)^T \phi(x_i)(+e_i)$, where, $\phi(W)$ is a regional regression matrix from H to R, and $e_i \in R^d$ is a noise item.

Therefore, a target function may be also rewritten as learning and lower-dimensional embedding Y, and a mapping matrix is:

$$\min_{\omega_i, Y} \sum_{i=1}^{n} (\| X_i^T W_i + 1_j c_i^T - Y_i \|_F^2 + \gamma \| \omega_i \|_F^2) +$$
$$\mu(\| \Phi(X)^T \Phi(W) + 1_n E^T - Y \|_F^2) + \gamma \| \Phi(W) \|_F^2 \quad \text{s.t.} \quad Y^T Y = I$$

where, $1_j \in R^j$ and $1_n \in R^n$ are two vectors of all vectors. Then, y may be calculated as follows:

$$y = Y^T (HKH + \gamma I)^{-1} HK_x + \frac{1}{n} Y^T 1_n - \frac{1}{n} Y^T (HKH + \gamma I)^{-1} HK 1_n \quad (14)$$

where, $$H = I - \frac{1}{n} 1_n 1_n^T$$

indicates a global center matrix, $K_x \in R^n$ indicates a vector having the ith element $K_{xi} = \phi(x)^T \phi(x_i) = \exp(-\|x - x_i\|^2 / \sigma^2)$, and $x_i \in X$ is the ith RBSR descriptor in a training set (a characteristic indication of the three-dimensional face image). In order to avoid over-fitting, local principal component analysis (PCA) is executed to reduce a dimension serving as a RBSR descriptor of each pre-processed face.

In multi-task learning, a prolonged training set of a RBSR descriptor is given, the RBSR descriptor $\{(x_i^k, y_i^k)\}_{i=1}^{m_k}$ may be calculated by using the formula (14), $x_i^k \in R^n$ indicates a RBSR descriptor used for the ith training sample of the kth application, $y_i^k$ indicates a corresponding output, and $m_k$ is the number of points on the face, which indicates lower-dimensional embedding of a corresponding label of the entire image. Therefore, regression vectors of all face areas in the regression matrix $A=[\alpha_1, \ldots, \alpha_k] \in R^{n \times k}$ may be estimated according to the following formula:

Maximum subsequent estimated values of face recognition and expression description are obtained by using the formula (15):

$$(A^k)^* = \arg\min_{A^k} P(y \mid A^k, \mu_1) P(y \mid \mu_2) \prod_{j=1}^{N} P(\alpha_j^k \mid \delta_j) \prod_{k=1}^{2} \prod_{i=1}^{m_i} P(y_i^k \mid A^k, x_i^k, \sigma^k) \quad (15)$$

where, $\mu_1$ and $\mu_2$ are parameters of a specific application, and it is assumed that a corresponding target $y^k \in R$ for the kth application has a gaussian distribution with an average value $y^k \in R$ and a precision $\sigma^k > 0$:

$$p(y_i^k \mid A^k, x_i^k, \sigma^k) = \sqrt{\frac{\sigma^k}{2\pi}} \exp\left(\frac{-\sigma^k (y^k - (A^k)^T x^k)}{2}\right) \quad (16)$$

It is assumed that a priori probability $p(A^k|\delta^k)$ is generated according to an existing exponent $p(A^k|\delta^k) \propto \exp(-\|A^k\|\delta^k)$, paired data x, y is obtained from the formula (15), and, $A^1, \ldots,$ and $A^n$ are obtained from the formula (16), a classification result based on a maximum probability may be obtained:

$$p(y \mid A, X, \delta) = \prod_{k=1}^{2} \prod_{i=1}^{m^k} p(y_i^k \mid A^k, x_i^k, \sigma^k), \ p(A \mid \delta) = \prod_{i=1}^{n} p(A^k \mid \delta^k) \quad (17)$$

Then, an optimal estimated value of the regression matrix A may be obtained as follows:

$$A^* = \arg\min_{A} p(y \mid A, \mu_1) p(y \mid \mu_2) p(y \mid A, X, \delta) p(A \mid \delta) \quad (18)$$

Then, a high-dimensional RBSR descriptor may be embedding into an inherent lower-dimensional characteristic vector by using the formula (13).

In this embodiment, by embedding a high-dimensional RBSR descriptor into an inherent lower-dimensional characteristic vector, a characteristic of a lower-dimensional three-dimensional face image can be obtained, thereby further reducing calculation costs. Meanwhile, the distinguishing ability for face recognition and the description ability for expression analysis can be effectively balanced, and the extracted characteristic can better reflect the face surface structure, so as to avoid artifact distortion and noise damage.

Figure 5:
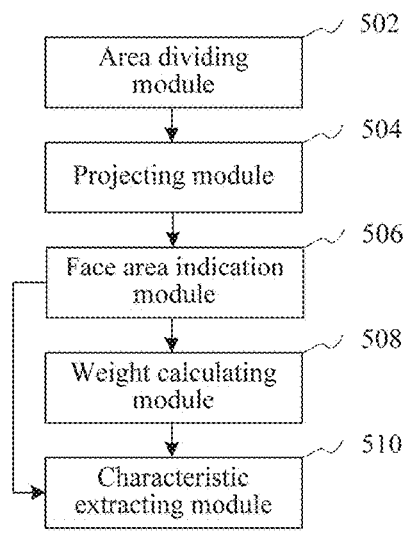
FIG. 5 is a structural block diagram of a system for extracting a characteristic of a three-dimensional face image according to an embodiment.

As shown in FIG. 5, in an embodiment, a system for extracting a characteristic of a three-dimensional face image is further provided, including a processor and a software module executed by the processor, the software module including:

an area dividing module 502, configured to perform face area division, to obtain a group of face areas;

a projecting module 504, configured to project each face area onto a corresponding regional bounding sphere;

a face area indication module 506, configured to obtain an indication of the corresponding face area according to the regional bounding sphere, and record the indication as a regional bounding spherical descriptor of the face area;

a weight calculating module 508, configured to calculate a weight of the regional bounding spherical descriptor of the face area for each face area; and a characteristic extracting module 510, configured to obtain a characteristic of a three-dimensional face image according to the indication of the face area and the weight of the corresponding regional bounding spherical descriptor.

In an embodiment, a group of face areas obtained by means of division includes seven areas: a nose area, a left eye area, a right eye area, a left cheek area, a right cheek area, a forehead area and a mouth area.

Figure 6:
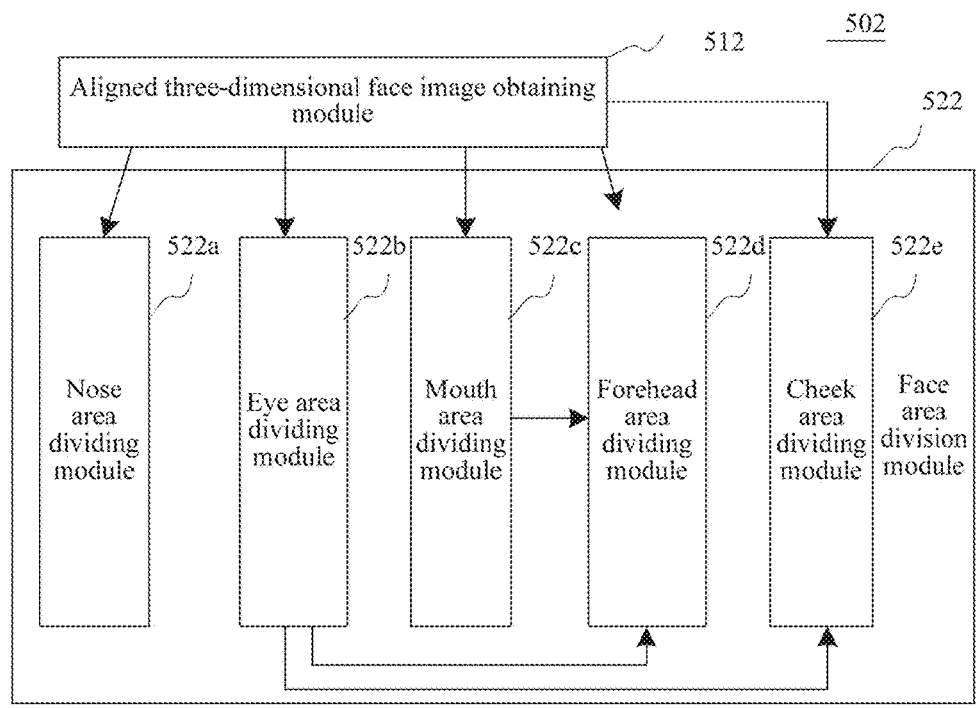
FIG. 6 is a structural block diagram of an area dividing module according to an embodiment.

In an embodiment, as shown in FIG. 6, the area dividing module 502 includes:

an aligned three-dimensional face image obtaining module 512, configured to obtain a three-dimensional face image aligned with a reference face model; and a face area division module 522, configured to obtain shape bands of different face areas extracted from the reference face model, and dividing the three-dimensional face image to obtain a nose area, a left eye area, a right eye area, and a mouth area; and divide, according to the nose area, the left eye area, the eye area and the mouth area obtained by means of division, the three-dimensional face image to obtain a forehead area, a left cheek area and a right cheek area.

The face area division module 522 includes:

a nose area dividing module 522a, configured to detect a nasal tip point on the three-dimensional face image, obtain a shape band of a nose area extracted from the reference face model, and divide, according to the nasal tip point and the shape band of the nose area, to obtain the nose area in the three-dimensional face image;

an eye area dividing module 522b, configured to separately detect inner eye corner locations of a left eye and a right eye on the three-dimensional face image, obtain a shape band of an eye area extracted from the reference face model, and divide, according to the inner eye corner locations and the shape band of the eye area, to obtain the left eye area and the right eye area in the three-dimensional face image;

a mouth area dividing module 522c, configured to obtain a shape band of a mouth area extracted from the reference face model, and divide, according to the shape band of the mouth area, to obtain the mouth area in the three-dimensional face image;

a forehead area dividing module 522d, configured to divide, according to the left eye area and the right eye area, to obtain the forehead area in the three-dimensional face image; and a cheek area dividing module 522e, configured to divide, according to the left eye area, the right eye area and the mouth area, to obtain the left cheek area and the right cheek area in the three-dimensional face image.

Figure 7:
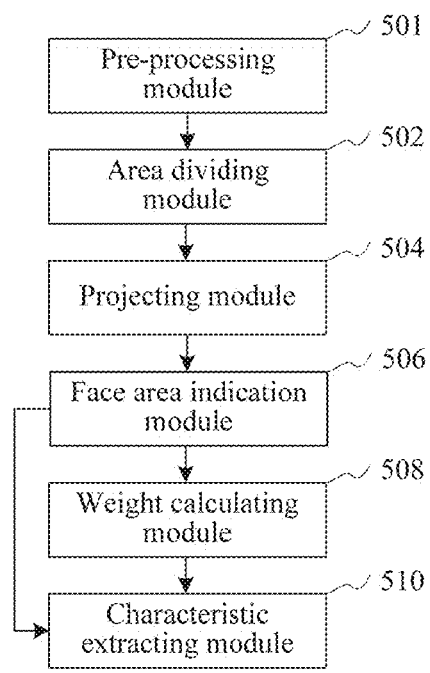
FIG. 7 is a structural block diagram of a system for extracting a characteristic of a three-dimensional face image according to another embodiment.
Figure 8:
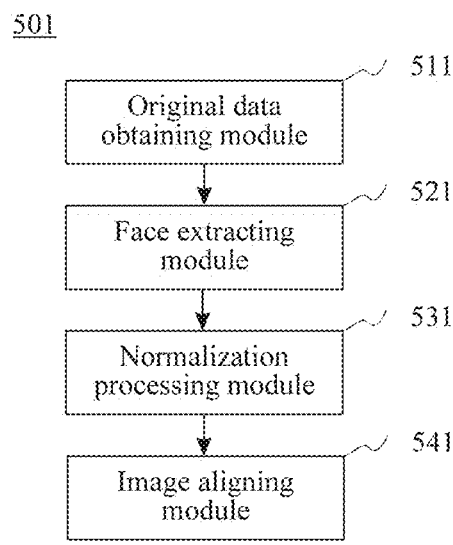
FIG. 8 is a structural block diagram of a pre-processing module according to an embodiment.

In an embodiment, as shown in FIG. 7, a system for extracting a characteristic of a three-dimensional face image further includes a pre-processing module 501, and with reference to FIG. 8, the pre-processing module 501 includes:

an original data obtaining module 511, configured to obtain original three-dimensional face point cloud data;

a face extracting module 521, configured to extract main face data in the original three-dimensional face point cloud data;

a normalization processing module 531, configured to perform normalization processing on the main face data; and an image aligning module 541, configured to align a three-dimensional face image obtained after the normalization processing with the reference face model, to obtain the three-dimensional face image aligned with the reference face model.

Figure 9:
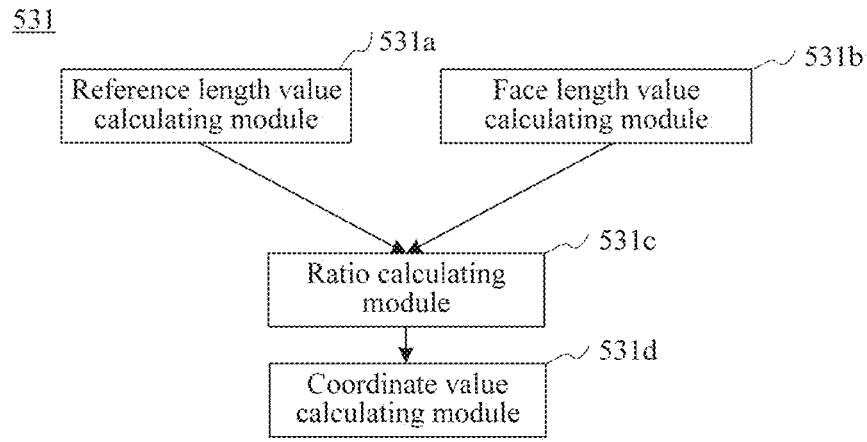
FIG. 9 is a structural block diagram of a normalization processing module according to an embodiment.

Further, in an embodiment, as shown in FIG. 9, the normalization processing module 531 includes:

a reference length value calculating module 531a, configured to obtain the reference face model, and calculating a horizontal-direction reference length value and a perpendicular-direction reference length value of the reference face model;

a face length value calculating module 531b, configured to calculate a horizontal-direction length value and a perpendicular-direction length value of the main face data;

a ratio calculating module 531c, configured to calculate a ratio of the horizontal-direction length value of the main face data to that of the reference face model and a ratio of the perpendicular-direction length value of the main face data to that of the reference face model; and a coordinate value calculating module 531d, configured to implement normalization on the main face data in a horizontal direction according to the ratio of the horizontal-direction length values and a coordinate value of the main face data in each horizontal direction, and implement normalization on the main face data in a perpendicular direction according to the ratio of the perpendicular-direction length values and a coordinate value of the main face data in each perpendicular direction.

Specifically, the coordinate value calculating module 531d may be configured to divide the ratio of the horizontal-direction length values by each coordinate value x or y in the horizontal direction of the main face data; and divide the ratio of the perpendicular-direction length values in the perpendicular direction by each coordinate value x or y in the perpendicular direction of the main face data.

Figure 10:
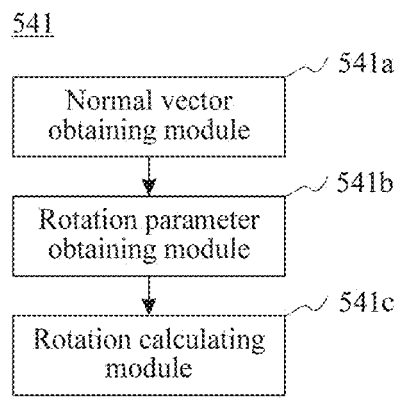
FIG. 10 is a structural block diagram of an image aligning module according to an embodiment.

In an embodiment, as shown in FIG. 10, the image aligning module 541 includes:

a normal vector obtaining module 541a, configured to separately fit point cloud data on a symmetrical side hachure for the reference face model and the three-dimensional face image obtained after the normalization processing, to obtain a first normal vector on a symmetrical side hachure fitting plane of the reference face model and a second normal vector on a symmetrical side hachure fitting plane of the three-dimensional face image;

a rotation parameter obtaining module 541b, configured to obtain a rotation angle value which is an included angle between the first normal vector and the second normal vector, and obtain a rotation axis which is a cross product of the first normal vector and the second normal vector; and a rotation calculating module 541c, configured to obtain, according to each point on the three-dimensional face image obtained after the normalization processing, the rotation angle value and the cross product, the three-dimensional face image aligned with the reference face model.

In an embodiment, the face area indication module 506 is configured to calculate a value of a point on the face area for each face area, where the value of the point on the face area is a ratio of a distance between the point and the sphere center of the regional bounding sphere corresponding to the face area to the radius of the regional bounding sphere; and the indication of the face area is a vector formed by values of points on the face area.

Figure 11:
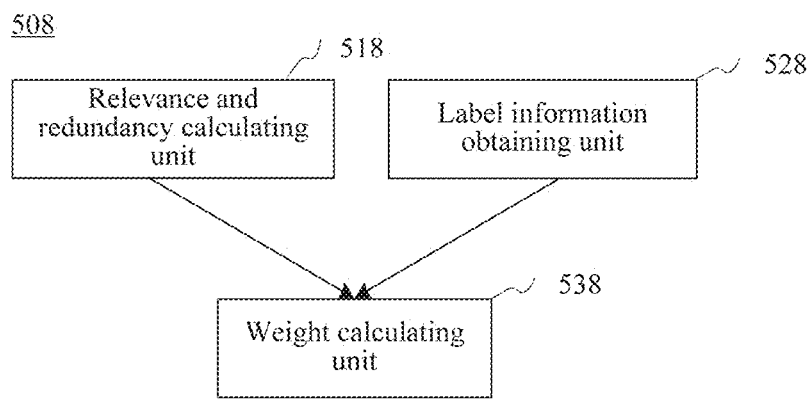
FIG. 11 is a structural block diagram of a weight calculating module according to an embodiment.

In an embodiment, as shown in FIG. 11, the weight calculating module 508 includes:

a relevance and redundancy calculating unit 518, configured to calculate relevance and redundancy among all regional bounding spherical descriptors;

a label information obtaining unit 528, configured to obtain label information provided for each face area and label information provided for the three-dimensional face image; and a weight calculating unit 538, configured to calculate the weight of the regional bounding spherical descriptor of each face area according to the relevance, the redundancy and the label information.

Further, in an embodiment, the weight calculating unit 538 is configured to calculate the weight of the regional bounding spherical descriptor of each face area according to the following formula:

$$P(RBSR|r_i) = \prod_{rbsri \in RBSR} P(l_i|r_i) \prod_{rbsrj \in RBSR} P(l_j|l_i, r_i) P(D, R|r_i, l_i, l_j)$$

where, $l_i, l_j \in L$ is the label information provided for each face area; D is the relevance obtained by means of calculation; R is the redundancy obtained by means of calculation; $r_i$ indicates the ith face area; $rbsr_i$ indicates a regional bounding spherical descriptor of the ith face area; $rbsr_j$ indicates a regional bounding spherical descriptor of the jth face area; RBSR indicates regional bounding spherical descriptors of all face areas; $P(RBSR|r_i)$ indicates a weight of the regional bounding spherical descriptor of the ith face area.

In another embodiment, the weight calculating unit 538 is configured to calculate the weight of the regional bounding spherical descriptor of each face area according to the following formula:

$$\omega r_i = \sum_{l \in L} \log(P(b_l|r_i))$$

where, $\omega r_i$ indicates a weight of the regional bounding spherical descriptor of the ith face area; $\log(P(b_l|r_i))$ is a binary probability, and $$\log(P(b_l|r_i)) = \sum_{rbsri \in RBSR} \sum_{rbsrj \in RBSR} \log(P(D, R|r_i, l_i, l_j)),$$

where: $rbsr_i$ indicates a regional bounding spherical descriptor of the ith face area; $rbsr_j$ indicates a regional bounding spherical descriptor of the jth face area; D is the relevance obtained by means of calculation; R is the redundancy obtained by means of calculation; $l_i, l_j \in L$ is the label information provided for each face area; $r_i$ indicates the ith face area; $b^l$ is the label information provided for the three-dimensional face image.

In an embodiment, the characteristic extracting module 510 is configured to obtain the characteristic of the three-dimensional face image which is a sum of products of indications of all face areas and weights of regional bounding spherical descriptors of the corresponding face areas.

Figure 12:
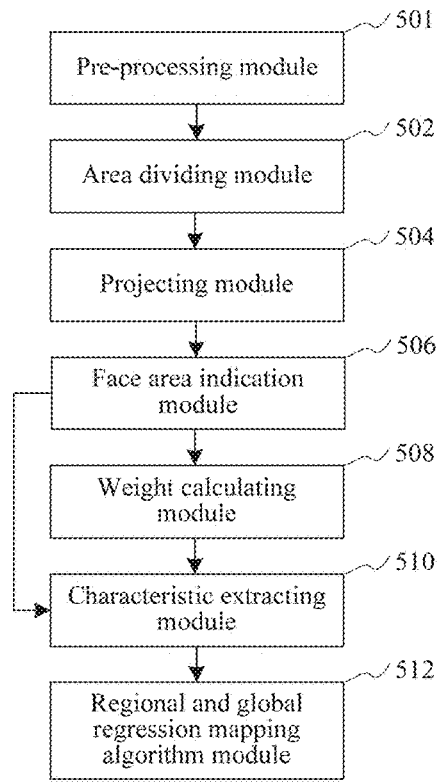
FIG. 12 is a structural block diagram of a system for extracting a characteristic of a three-dimensional face image according to still another embodiment.

In an embodiment, as shown in FIG. 12, the system for extracting a characteristic of a three-dimensional face image further includes:

a regional and global regression mapping algorithm module 512, configured to embed the characteristic of the three-dimensional face image into an inherent lower-dimensional characteristic vector according to the following formula:

$$Z = AX$$

where X is the characteristic of the three-dimensional face image; and A is a regression matrix formed by the inherent lower-dimensional characteristic vector.

In the foregoing method and system for extracting a characteristic of a three-dimensional face image, face area division is performed based on a shape band, and an original three-dimensional face image is divided into a group of face areas, which can notably reduce impact from a distinguishing area, and can provide a better manner for subsequent characteristic indication and characteristic extraction to describe a face area characteristic. The area division method based on a shape band has very well robustness.

Because each face area obtained by means of division is projected onto a corresponding regional bounding sphere, and a regional bounding spherical descriptor of the face area is indicated according to the regional bounding sphere, three-dimensional location information of an original face image can be effectively converted into a one-dimensional vector having geometrical and shape characteristics, and a characteristic of an area can be highlighted, where the one-dimensional vector can effectively reduce calculation costs and can save storage space. By calculating weights of regional bounding spherical descriptors of different face areas, surface shape characteristics of different faces can be effectively reflected, and a weighted regional bounding spherical descriptor can reflect both a face distinguishing ability and an expression description ability, so that an extracted characteristic of a three-dimensional face image can satisfy both face recognition and emotion analysis.

The extracted characteristic of the three-dimensional face image is less than the original three-dimensional face point cloud data in dimension, and can be used for lower-dimensional face recognition and expression classification. The extracted characteristic of the three-dimensional face image is embedding into a lower-dimensional characteristic vector, and the dimension of the characteristic can be further reduced, so that the original three-dimensional area descriptor may be converted into an efficient lower-dimensional characteristic vector having low redundancy, thereby further reducing calculation costs and storage space.

Beneficial effects that the present disclosure can achieve are described in detail below in combination with experimental data.

The foregoing method for extracting a characteristic of a three-dimensional face image may be run in three databases: a FRGC v2 database, a BU3DFE database and a CASIA 3D face database.

The FRGC v2 database is an international general database used for evaluating 3D face recognition and verification performance, which includes 466 different individuals, and has 4007 three-dimensional face models. In a standard protocol for processing 3D face recognition and verification, the shape of a three-dimensional face in the FRGC database is formed by four matrixes having the same resolution of 640*480. A binary matrix indicates an effective point of an object obtained by dividing a background. Three other matrixes describe locations of components X, Y, and Z in a cartesian coordinate system. A corresponding color image is captured by scanners having the same resolution simultaneously. The database includes samples of different genders from a large range of ages, where more than 40% of faces are sheltered by hair, and also includes stretched changes and different lighting conditions collected in uncontrollable environments. During the collection, some artifacts are provided, such as holes existing around the nose, the eyes, and the mouth. The BU-3DFE 3D face expression database includes 2500 3D face expression models from 100 different individuals having a neutrality and six expressions (anger, disgust, fear, happiness, sadness and surprise). Based on 83 characteristic points defined on a face model registered with the BU-3DFE database, the number of face areas and characteristic sets may be generated for expression analysis. The CASIA 3D face database covers 123 individuals, and each individual has about 37 images or 37 images. The total number of 3D face models is 4625, which not only includes changes in postures, expressions and illumination, but also includes a change in a combination of lighting from the right side and a posture having a smiling expression.

Figure 13:
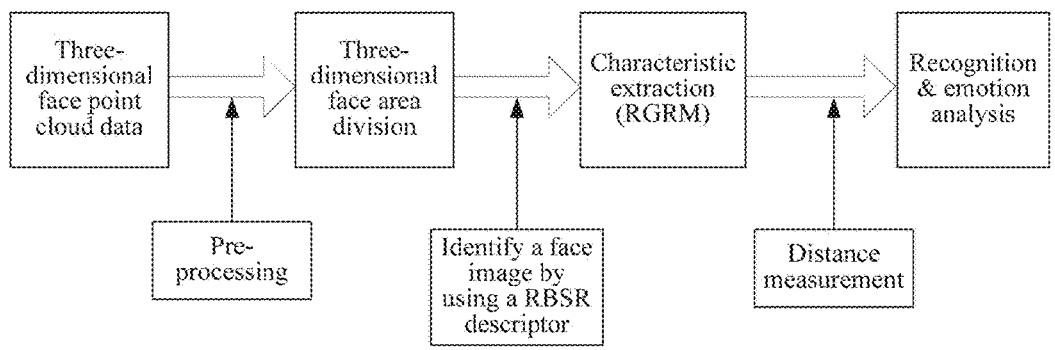
FIG. 13 is a diagram of a frame for three-dimensional face recognition and expression analysis according to an embodiment.

In an experiment, a frame shown in FIG. 13 is used. Original three-dimensional face point cloud data is pre-processed first, then three-dimensional face area division is performed on pre-processed three-dimensional face point cloud data, to obtain corresponding seven face areas, a three-dimensional face image is indicated by using a RBSR descriptor, and then characteristics of the final three-dimensional face image are extracted by using a RGRM algorithm, where the extracted characteristics are used for indicating different individuals.

Specifically, the foregoing method for extracting a characteristic of a three-dimensional face image is evaluated from the following several aspects:

1. Performance Evaluation on 3D face Recognition and Verification (1) 3D Face Recognition Based on Different Indications In an experiment, an object needs to be indicated by using a RBSR descriptor used for indicating a characteristic of a three-dimensional face image provided in the present disclosure, and this manner is compared with other manners used for indicating a 3D face. Other manners of indicating a 3D face include: surface normal (SN), surface curvature (SC), depth image (DI) and shape index descriptor (SID). In an experiment, multiple test databases used for performance evaluation are introduced, and the FRGC v2 database may be divided into two subsets: a training set and a test set. Because each individual has different numbers of face models in the databases, it is ensured that an individual has at least i+1 samples in each test database, i training samples are randomly selected for each individual, and meanwhile the rest face models are allocated to the test database. Table 1 shows configurations of test and training sets.

TABLE 1

| Test database | i | Number of test subjects | Training set | Test set |
| --- | --- | --- | --- | --- |
| 1 | 1 | 410 | 410 | 3541 |
| 2 | 2 | 384 | 768 | 3183 |
| 3 | 3 | 316 | 948 | 3003 |
| 4 | 4 | 285 | 1140 | 2755 |

Table 2 shows recognition precision based on different indications. Compared with all test configurations, particularly, other indications used for the test databases 3 and 4, the RBSR descriptor provides precision of a higher level. Compared with other indications, the shape index descriptor implements second precision, and compared with the surface normal and the depth image, the surface curvature has better performance. The result demonstrates effectiveness of the RBSR descriptor on challenging face changes and sensor information. The surface normal may be calculated according to a differential geometrical surface, and they actually can encode a local change of a surface. However, the surface normal is sensitive to an external condition, and the worst result is obtained in a case in which the posture and the lighting are changed. The surface curvature can make a face surface serve as an object in a free format, and it is noted that a local descriptor indicates face shape information. However, because of a large noise and damage, the performance of the surface curvature is notably reduced due to non-rigid conversion. The depth image actually can reflect a distance between an individual and a sensor configured to effectively distinguish characteristic extraction. The shape index descriptor is combined with the shape and the distance information, which makes it have a better distinguishing ability than those of the other three indications. The RBSR descriptor may effectively convert original locations on the three axes into indication vectors, and can process the originally registered 3D face image into an area indication having more distinguishing characteristics. The experimental result demonstrates that, compared with other frequently used indications, the RBSR descriptor is obviously improved.

TABLE 2

| Test database | RBSR | DI | SC | SN | SID |
|---|---|---|---|---|---|
| 1 | 56.48% | 45.38% | 47.47% | 42.36% | 49.59% |
| 2 | 62.68% | 47.76% | 53.13% | 46.97% | 59.75% |
| 3 | 70.1% | 53.08% | 56.51% | 51.32% | 63.07% |
| 4 | 74.23% | 57.71% | 61.6% | 57.75% | 70.13% |

(2) 3D Face Verification Based on Standard Protocol

Figure 14:
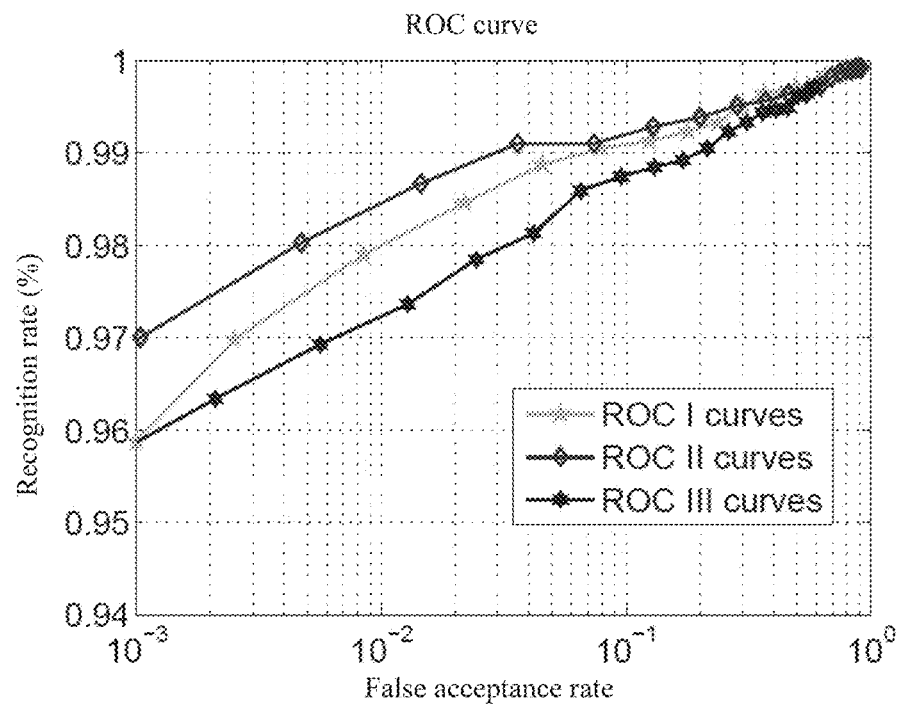
FIG. 14 is a schematic diagram of ROC curves on FRGC 3D face data in different test sets.

In an experiment, some existing algorithms used for 3D face verification are used, and are compared with the method provided in the present disclosure. In order to verify effectiveness of different problems in the FRGC v2 database, a receiver operating characteristic (ROC) curve is tested for the standard protocol of the FRGC v2 database in different sampling periods. Table 3 shows verification results of different 3D face recognition algorithms based on the standard protocol, which have a false acceptance rate (FAR) of 0.1%. As shown in FIG. 14, FIG. 14 shows ROC curves on the FRGC v2 3D face database in different test sets.

TABLE 3

| Method | ROC I | ROC II | ROC III |
|---|---|---|---|
| Faltemier | — | — | 94.9% |
| Husken | — | — | 86.9% |
| Cook | 93.71% | 92.91% | 92.01% |
| Kakadiaris | 97.3% | 97.2% | 97% |
| Ocegueda | 96.2% | 95.7% | 95.2% |
| Queirolo | — | — | 96.6% |
| Alyuz | 85.39% | 85.63% | 85.64% |
| Mian | — | — | 86.6% |
| The present disclosure | 95.67% | 95.28% | 95.03% |

It can be known from Table 3 that, for ROC I, ROC II and ROC III curves tested by means of the standard protocol, the present disclosure is better than most existing algorithms, and although the present disclosure is not better than two algorithms: Kakadiaris and Queirolo, the present disclosure is better in calculation performance, while these two algorithms are complex, and need considerable calculation costs and storage space. Table 4 shows recognition time of each step used for 3D face processing in the present disclosure. It can be known from table 4 that, the present disclosure only spends 5.958 seconds in processing entire face data. Additionally, the present disclosure not only considers face verification, but also considers expression classification precision. Therefore, the present disclosure may effectively balance simple examples, has high precision and high calculation efficiency, and has better performance in aspects of precision and effectiveness.

TABLE 4

| | |
|---|---|
| Average number of points | 100474 |
| Face area extraction | 2.3 s |
| Nasal tip detection | 0.04 s |
| Face area refining | 1.46 s |
| Face area division | 1.05 s |
| Posture alignment | 0.26 s |
| RBSR | 0.694 s |
| RGSRM | 0.154 s |

2. 3D Face Expression Analysis (1) Data Processing and Comparison of Different 3D Face Expression Characteristics An experiment is performed on the BU-3DFE database, so as to prove a description capability of 3D face expression analysis. When comparison between an emotion characteristic and other emotion characteristics is evaluated, the KLD (Kullback-Leibler Divergence, KL divergence) is introduced. According to the bayesian perspective, the expression description ability depends on the classification condition distribution. Therefore the face expression description ability of the characteristic set y may be calculated by using the KLD:

$$DP(y) = \sum_{i=1}^{c} \sum_{j=i+1}^{c} Ds(f_i(y) \| f_j(y))$$

where, c is the number of face expression classifications (6 prototype expressions), and $f_i(y)$ and $f_j(y)$ are respectively the ith and jth classification condition probabilities of the characteristic vector y.

Figure 15:
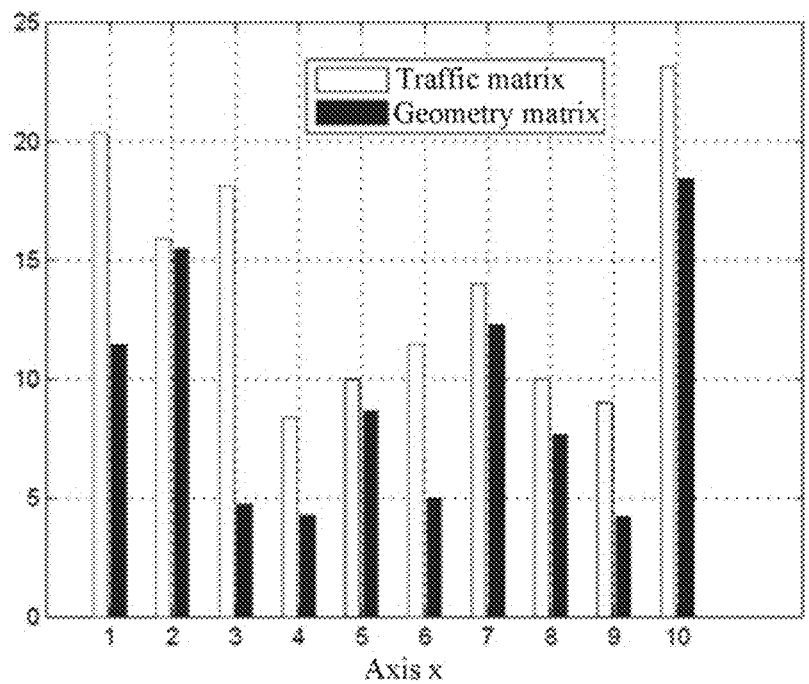
FIG. 15 is a schematic diagram of comparing description capabilities of ten characteristics.

Table 5 shows details of the characteristics compared in the experiment. The characteristics shown in table 5 are executed in a series of experiments to determine expression classifications, all these experiments are repeated 100 times to reduce randomness, and 50 face models are randomly selected from each expression classification each time. In order to better reflect the expression description ability, a traffic matrix and a geometry matrix are separately introduced into 3D face expression analysis, and an analysis result is shown in FIG. 15.

TABLE 5

| Name | Face expression characteristic |
|---|---|
| Characteristic 1 | Select former 68 characteristic points defined in each face model |
| Characteristic 2 | Select 15 characteristic points defined in a face outline |
| Characteristic 3 | Select all 83 characteristic points defined in each face model |
| Characteristic 4 | Select a distance vector $D_i$ (formed by 6 distance characteristics) |
| Characteristic 5 | Select a distance vector $D_i$ (formed by 24 distance characteristics) |
| Characteristic 6 | Select a slope vector $S_i$ (formed by 10 slope characteristics) |
| Characteristic 7 | Select a slope vector $S_i$ (formed by 12 slope characteristics) |
| Characteristic 8 | Select a distance vector $D_i$ and an angle vector $A_i$ together |

TABLE 5-continued

| Name | Face expression characteristic |
| --- | --- |
| Characteristic 9 | Select a distance vector $D_i$ and a slope vector $S_i$ together |
| Characteristic 10 | Characteristic extracted in the present disclosure |

It can be known from FIG. 15 that, the characteristic extracted in the present disclosure can provide the best face expression description ability. For all characteristics, the description ability in the traffic matrix is better than the description ability in the geometry matrix form. Just because the characteristic provided in the present disclosure has a better description ability than those of other characteristics, coding of emotional descriptive information of more 3D face expressions becomes possible.

(2) 3D Face Expression Recognition

Figure 16:
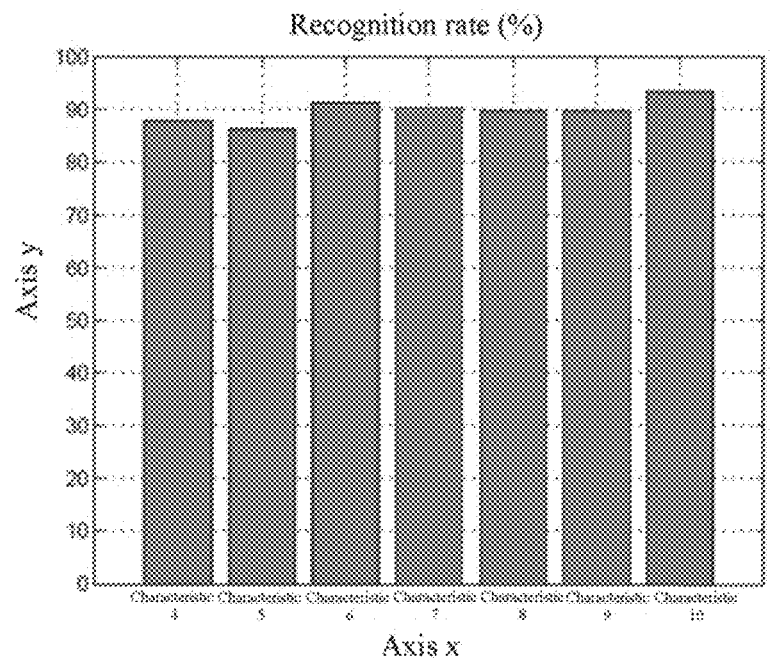
FIG. 16 is a schematic diagram of comparing recognition rates in the case of different characteristics.
Figure 17:
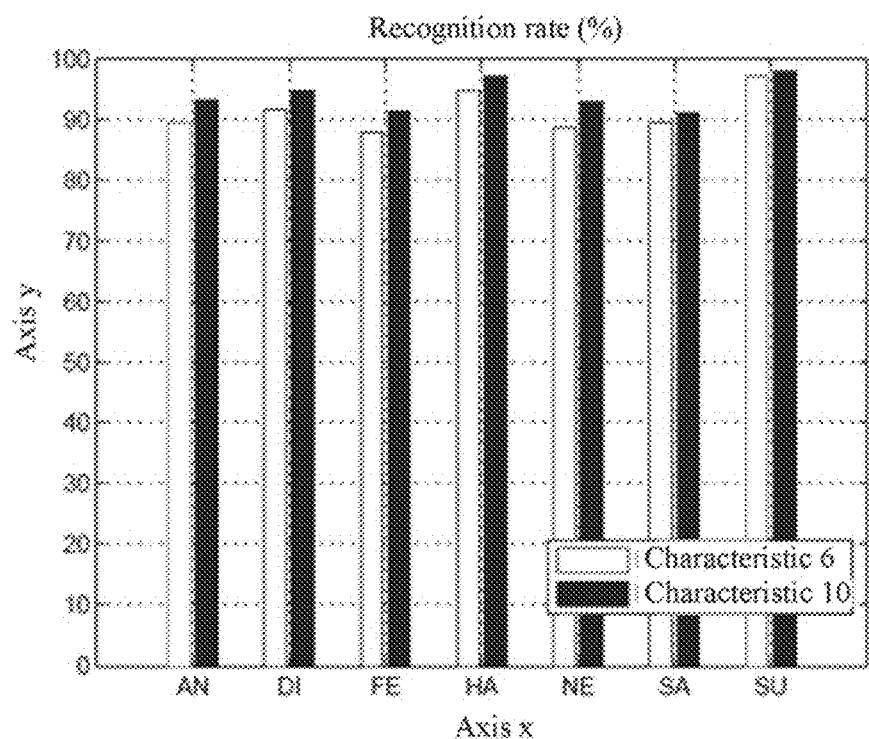
FIG. 17 is a schematic diagram of comparing recognition rates of characteristic 6 and characteristic 10 in different expressions.

In order to verify the expression classification recognition result, a result based on the BU-3DFE database is provided, 50 objects are randomly selected as a training set, and the rest objects serve as a separate test group for evaluating individuals. Each experiment is repeated 100 times, to obtain an average value. Recognition rates of different characteristics are shown in FIG. 16. It can be known from FIG. 16 that, the characteristic extracted in the present disclosure achieves the highest recognition rate among all characteristics, and characteristic 6 has a second highest recognition rate. As shown in FIG. 17, in different expressions, the characteristic provided in the present disclosure has a higher recognition rate than that of characteristic 6. Therefore, the characteristic extracted in the present disclosure achieves the best performance in the expression classification, and the performance displays that the characteristic extracted in the present disclosure can better process face expressions and extract stronger characteristic vectors.

3. Robustness of a Large Face Posture Variance

The face recognition precision is notably reduced due to a large face posture variance. Because self-sheltering and posture variances cause data loss, the CASIA 3D face database is used to evaluate performance, to prove that the present disclosure has robustness for a large posture variance. For this database, a rank-1 recognition rate is compared between the present disclosure and an existing popular method. A training set includes 759 images, which are corresponding to latter 23 individuals of 123 individuals, and each subject includes 22 images. The training set is further divided into the following 4 subsets:

1) small posture variance (SPV, 700 images): images in the front, at 20-30 degrees on the left/right, at 20-30 degrees on the top/bottom and at 20-30 degrees slanted to the left/right;

2) large posture variance (LPV, 200 images): images at 50-60 degrees on the left/right;

3) small posture variance with a smile (SPVS, 700 images): images with a smiling expression in the front, at 20-30 degrees on the left/right, at 20-30 degrees on the top/bottom and at 20-30 degrees slanted to the left/right; and 4) large posture variance with a smile (LPVS, 200 images): images with a smiling expression at 50-60 degrees on the left/right.

Table 6 shows a rank-1 recognition rate in the CASIA 3D face database. It can be known from Table 6 that, a large posture variance, particularly an expression change combined with the foregoing method, notably affects recognition precision. The present disclosure provides the best effect in a test set. In the present disclosure, the original three-dimensional face data is converted into a bounding sphere domain, and a distinguish characteristic is extracted, so as to overcome abnormal values and repair sheltering. In the sphere domain, a regional bounding spherical descriptor can reflect a face characteristic rotated in a large range, and reduce impact of missing data generated due to a large posture variance to a maximum extent. Therefore, the present disclosure is stable for a large posture variance. Moreover, the good performance obtained in the present disclosure is insusceptible to different databases, and therefore has generality.

TABLE 6

| Test database | SPV | LPV | SPVS | LPVS |
| --- | --- | --- | --- | --- |
| Depth | 90.7% | 50.0% | 81.0% | 46.5% |
| Strength | 69.9% | 49.5% | 68.1% | 48.5% |
| Gabor depth | 91.4% | 51.5% | 82.4% | 49.0% |
| Gabor strength | 75.3% | 65.5% | 77.6% | 61.5% |
| Decision fusion | 89.0% | 70.5% | 85.6% | 64.5% |
| Characteristic fusion | 91.0% | 91.0% | 87.9% | 79.0% |
| The present disclosure | 93.42% | 93.42.5% | 90.28% | 82% |

A person of ordinary skill in the art may understand that all or some of the procedures of the methods of the foregoing embodiments may be implemented by a computer program instructing relevant hardware. The program may be stored in a computer readable storage medium. When the program is executed, the program may include the procedures of the embodiments of the foregoing methods. The storage medium may be a magnetic disk, an optical disc, read-only memory (ROM), a random access memory (RAM) or the like.

The above embodiments only express several implementation manners of the present disclosure, which are described specifically and in detail, and therefore cannot be construed as a limitation to the patent scope of the present disclosure. It should be noted that, a person of ordinary skill in the art may make several deformations and improvements without departing from the idea of the present disclosure. All such deformations and improvements fall within the protection scope of the present disclosure. Therefore, the patent protection scope of the present disclosure shall be subject to the appended claims.

What is claimed is:

1. A method for extracting a characteristic of a three-dimensional face image, performed by a computer program instructing relevant hardware, comprising:

performing face area division to a three-dimensional face image, to obtain a group of face areas;

projecting each face area onto a corresponding regional bounding sphere;

obtaining an indication of the corresponding face area according to the regional bounding sphere, and recording the indication as a regional bounding spherical descriptor of the face area;

calculating a weight of the regional bounding spherical descriptor of the face area for each face area according to values of interaction information between the regional bounding spherical descriptor of the face area and regional bounding spherical descriptors of other face areas within the group of face areas; and obtaining a characteristic of the three-dimensional face image according to the indication of each face area and the corresponding weight, wherein the characteristic includes both identity and emotion information of the three-dimensional face image;

wherein the step of obtaining an indication of the corresponding face area according to the regional bounding sphere comprises: calculating a value of a point on the face area for each face area, wherein the value of the point on the face area is a ratio of a distance between the point and the sphere center of the regional bounding sphere corresponding to the face area to the radius of the regional bounding sphere; and the indication of the face area is a vector formed by values of points on the face area.

2. The method according to claim 1, wherein the performing face area division comprises:
   obtaining a three-dimensional face image aligned with a reference face model; and
   obtaining shape bands of different face areas extracted from the reference face model, and dividing the three-dimensional face image to obtain a nose area, a left eye area, a right eye area, and a mouth area; and dividing, according to the nose area, the left eye area, the eye area and the mouth area obtained by means of division, the three-dimensional face image to obtain a forehead area, a left cheek area and a right cheek area.

3. The method according to claim 1, wherein the step of obtaining shape bands of different face areas extracted from the reference face model, and dividing the three-dimensional face image to obtain a nose area, a left eye area, a right eye area, and a mouth area; and dividing, according to the nose area, the left eye area, the eye area and the mouth area obtained by means of division, the three-dimensional face image to obtain a forehead area, a left cheek area and a right cheek area comprises:
   detecting a nasal tip point on the three-dimensional face image, obtaining a shape band of a nose area extracted from the reference face model, and dividing, according to the nasal tip point and the shape band of the nose area, to obtain the nose area in the three-dimensional face image;
   separately detecting inner eye corner locations of a left eye and a right eye on the three-dimensional face image, obtaining a shape band of an eye area extracted from the reference face model, and dividing, according to the inner eye corner locations and the shape band of the eye area, to obtain the left eye area and the right eye area in the three-dimensional face image;
   obtaining a shape band of a mouth area extracted from the reference face model, and dividing, according to the shape band of the mouth area, to obtain the mouth area in the three-dimensional face image;
   dividing, according to the left eye area and the right eye area, to obtain the forehead area in the three-dimensional face image; and
   dividing, according to the left eye area, the right eye area and the mouth area, to obtain the left cheek area and the right cheek area in the three-dimensional face image.

4. The method according to claim 1, wherein before the step of performing three-dimensional face area division, the method further comprises:
   obtaining original three-dimensional face point cloud data;
   extracting main face data in the original three-dimensional face point cloud data;
   performing normalization processing on the main face data; and
   aligning a three-dimensional face image obtained after the normalization processing with the reference face model, to obtain the three-dimensional face image aligned with the reference face model.

5. The method according to claim 4, wherein the performing normalization processing on the main face data comprises:
   obtaining the reference face model, and calculating a horizontal-direction reference length value and a perpendicular-direction reference length value of the reference face model;
   calculating a horizontal-direction length value and a perpendicular-direction length value of the main face data;
   calculating a ratio of the horizontal-direction length value of the main face data to that of the reference face model and a ratio of the perpendicular-direction length value of the main face data to that of the reference face model; and
   implementing normalization on the main face data in a horizontal direction according to the ratio of the horizontal-direction length values and a coordinate value of the main face data in each horizontal direction, and implementing normalization on the main face data in a perpendicular direction according to the ratio of the perpendicular-direction length values and a coordinate value of the main face data in each perpendicular direction.

6. The method according to claim 4, wherein the step of aligning a three-dimensional face image obtained after the normalization processing with the reference face model comprises:
   separately fitting point cloud data on a symmetrical side hachure for the reference face model and the three-dimensional face image obtained after the normalization processing, to obtain a first normal vector on a symmetrical side hachure fitting plane of the reference face model and a second normal vector on a symmetrical side hachure fitting plane of the three-dimensional face image;
   obtaining a rotation angle value which is an included angle between the first normal vector and the second normal vector, and obtaining a rotation axis which is a cross product of the first normal vector and the second normal vector; and
   obtaining, according to each point on the three-dimensional face image obtained after the normalization processing, the rotation angle value and the cross product, the three-dimensional face image aligned with the reference face model.

7. The method according to claim 1, wherein the step of calculating a weight of the regional bounding spherical descriptor of the face area for each face area comprises:
   calculating relevance and redundancy among all regional bounding spherical descriptors;
   obtaining label information provided for each face area and label information provided for the three-dimensional face image, wherein the redundancy corresponds to the interaction information between the regional bounding spherical descriptor of the face area and regional bounding spherical descriptors of other face areas within the group of face areas; and
   calculating the weight of the regional bounding spherical descriptor of each face area according to the relevance, the redundancy and the label information.

8. The method according to claim 1, wherein the step of obtaining a characteristic of a three-dimensional face image according to the indication of the face area and the corresponding weight comprises:
   obtaining the characteristic of the three-dimensional face image which is a sum of products of indications of all face areas and weights of regional bounding spherical descriptors of the corresponding face areas.

9. The method according to claim 8, wherein the step of obtaining a characteristic of a three-dimensional face image according to the indication of the face area and the corresponding weight further comprises:

embedding the characteristic of the three-dimensional face image into an inherent lower-dimensional characteristic vector according to the following formula:

$$Z=AX$$

wherein X is the characteristic of the three-dimensional face image; and A is a regression matrix formed by the inherent lower-dimensional characteristic vector.

10. A system for extracting a characteristic of a three-dimensional face image, comprising a processor and a software module executed by the processor, the software module comprising:

an area dividing module, configured to perform face area division to a three-dimensional face image, to obtain a group of face areas;

a projecting module, configured to project each face area onto a corresponding regional bounding sphere;

a face area indication module, configured to obtain an indication of the corresponding face area according to the regional bounding sphere, and record the indication as a regional bounding spherical descriptor of the face area;

a weight calculating module, configured to calculate a weight of the regional bounding spherical descriptor of the face area for each face area according to values of interaction information between the regional bounding spherical descriptor of the face area and regional bounding spherical descriptors of other face areas within the group of face areas; and a characteristic extracting module, configured to obtain the three-dimensional face image according to the indication of each face area and the corresponding weight, wherein the characteristic includes both identity and emotion information of the three-dimensional face image;

wherein the face area indication module is configured to calculate a value of a point on the face area for each face area, wherein the value of the point on the face area is a ratio of a distance between the point and the sphere center of the regional bounding sphere corresponding to the face area to the radius of the regional bounding sphere; and the indication of the face area is a vector formed by values of points on the face area.

11. The system according to claim 10, wherein the area dividing module comprises:

an aligned three-dimensional face image obtaining module, configured to obtain a three-dimensional face image aligned with a reference face model; and a face area division module, configured to obtain shape bands of different face areas extracted from the reference face model, and dividing the three-dimensional face image to obtain a nose area, a left eye area, a right eye area, and a mouth area; and divide, according to the nose area, the left eye area, the eye area and the mouth area obtained by means of division, the three-dimensional face image to obtain a forehead area, a left cheek area and a right cheek area.

12. The system according to claim 11, wherein the face area dividing module comprises:

a nose area dividing module, configured to detect a nasal tip point on the three-dimensional face image, obtain a shape band of a nose area extracted from the reference face model, and divide, according to the nasal tip point and the shape band of the nose area, to obtain the nose area in the three-dimensional face image;

an eye area dividing module, configured to separately detect inner eye corner locations of a left eye and a right eye on the three-dimensional face image, obtain a shape band of an eye area extracted from the reference face model, and divide, according to the inner eye corner locations and the shape band of the eye area, to obtain the left eye area and the right eye area in the three-dimensional face image;

a mouth area dividing module, configured to obtain a shape band of a mouth area extracted from the reference face model, and divide, according to the shape band of the mouth area, to obtain the mouth area in the three-dimensional face image;

a forehead area dividing module, configured to divide, according to the left eye area and the right eye area, to obtain the forehead area in the three-dimensional face image; and a cheek area dividing module, configured to divide, according to the left eye area, the right eye area and the mouth area, to obtain the left cheek area and the right cheek area in the three-dimensional face image.

13. The system according to claim 10, wherein the system further comprises a pre-processing module, and the pre-processing module comprises:

an original data obtaining module, configured to obtain original three-dimensional face point cloud data;

a face extracting module, configured to extract main face data in the original three-dimensional face point cloud data;

a normalization processing module, configured to perform normalization processing on the main face data; and an image aligning module, configured to align a three-dimensional face image obtained after the normalization processing with the reference face model, to obtain the three-dimensional face image aligned with the reference face model.

14. The system according to claim 13, wherein the normalization processing module comprises:

a reference length value calculating module, configured to obtain the reference face model, and calculating a horizontal-direction reference length value and a perpendicular-direction reference length value of the reference face model;

a face length value calculating module, configured to calculate a horizontal-direction length value and a perpendicular-direction length value of the main face data;

a ratio calculating module, configured to calculate a ratio of the horizontal-direction length value of the main face data to that of the reference face model and a ratio of the perpendicular-direction length value of the main face data to that of the reference face model; and a coordinate value calculating module, configured to implement normalization on the main face data in a horizontal direction according to the ratio of the horizontal-direction length values and a coordinate value of the main face data in each horizontal direction, and implement normalization on the main face data in a perpendicular direction according to the ratio of the perpendicular-direction length values and a coordinate value of the main face data in each perpendicular direction.

15. The system according to claim 13, wherein the image aligning module comprises:
- a normal vector obtaining module, configured to separately fit point cloud data on a symmetrical side hachure for the reference face model and the three-dimensional face image obtained after the normalization processing, to obtain a first normal vector on a symmetrical side hachure fitting plane of the reference face model and a second normal vector on a symmetrical side hachure fitting plane of the three-dimensional face image;
- a rotation parameter obtaining module, configured to obtain a rotation angle value which is an included angle between the first normal vector and the second normal vector, and obtain a rotation axis which is a cross product of the first normal vector and the second normal vector; and
- a rotation calculating module, configured to obtain, according to each point on the three-dimensional face image obtained after the normalization processing, the rotation angle value and the cross product, the three-dimensional face image aligned with the reference face model.

16. The system according to claim 10, wherein the weight calculating module comprises:
- a relevance and redundancy calculating unit, configured to calculate relevance and redundancy among all regional bounding spherical descriptors, wherein the redundancy corresponds to the interaction information between the regional bounding spherical descriptor of the face area and regional bounding spherical descriptors of other face areas within the group of face areas;
- a label information obtaining unit, configured to obtain label information provided for each face area and label information provided for the three-dimensional face image; and a weight calculating unit, configured to calculate the weight of the regional bounding spherical descriptor of each face area according to the relevance, the redundancy and the label information.

17. The system according to claim 10, wherein the characteristic extracting module is configured to obtain the characteristic of the three-dimensional face image which is a sum of products of indications of all face areas and weights of regional bounding spherical descriptors of the corresponding face areas.

18. The system according to claim 17, wherein the system further comprises:
- a regional and global regression mapping algorithm module, configured to embed the characteristic of the three-dimensional face image into an inherent lower-dimensional characteristic vector according to the following formula:

$$Z=AX$$

wherein X is the characteristic of the three-dimensional face image; and A is a regression matrix formed by the inherent lower-dimensional characteristic vector.

* * * * *